United States Patent
Tsirkin

(10) Patent No.: US 11,971,830 B2
(45) Date of Patent: Apr. 30, 2024

(54) EFFICIENT QUEUE ACCESS FOR USER-SPACE PACKET PROCESSING

(71) Applicant: RED HAT, INC., Raleigh, NC (US)

(72) Inventor: Michael Tsirkin, Haifa (IL)

(73) Assignee: Red Hat, Inc., Raleigh, NC (US)

(*) Notice: Subject to any disclaimer, the term of this patent is extended or adjusted under 35 U.S.C. 154(b) by 59 days.

(21) Appl. No.: 17/701,568

(22) Filed: Mar. 22, 2022

(65) Prior Publication Data

US 2023/0315652 A1 Oct. 5, 2023

(51) Int. Cl.
*G06F 9/52* (2006.01)
*G06F 13/16* (2006.01)
*G06F 13/20* (2006.01)

(52) U.S. Cl.
CPC .......... *G06F 13/1668* (2013.01); *G06F 13/20* (2013.01)

(58) Field of Classification Search
None
See application file for complete search history.

(56) References Cited

U.S. PATENT DOCUMENTS

| | | | | |
|---|---|---|---|---|
| 6,418,460 | B1 * | 7/2002 | Bitar | G06F 9/462 |
| | | | | 718/108 |
| 6,766,515 | B1 * | 7/2004 | Bitar | G06F 9/4881 |
| | | | | 712/228 |
| 9,342,379 | B2 * | 5/2016 | Richardson | G06F 9/526 |
| 2006/0037020 | A1 * | 2/2006 | Accapadi | G06F 9/4812 |
| | | | | 718/102 |
| 2008/0178183 | A1 * | 7/2008 | Accapadi | G06F 9/4812 |
| | | | | 718/102 |
| 2011/0047310 | A1 * | 2/2011 | Bonola | G06F 13/24 |
| | | | | 710/268 |
| 2014/0281090 | A1 * | 9/2014 | Attinella | G06F 13/24 |
| | | | | 710/267 |
| 2015/0055456 | A1 * | 2/2015 | Agarwal | H04L 47/6295 |
| | | | | 370/230 |

(Continued)

FOREIGN PATENT DOCUMENTS

AU 2014206191 B2 6/2016

OTHER PUBLICATIONS

Jonathan Corbet, "Optimizing preemption", Aug. 14, 2013, lwn.net (Year: 2013).*

(Continued)

*Primary Examiner* — Hyun Nam
(74) *Attorney, Agent, or Firm* — Dority & Manning, P.A.

(57) ABSTRACT

An example method may include determining whether a preemption flag associated with a first input/output (I/O) handling thread is equal to a first value indicating that preemption of the first I/O queue handling thread is forthcoming, wherein the first I/O queue handling thread is executing on a first processor, the first I/O queue handling thread is associated with a first set of one or more queue identifiers, and each queue identifier identifies a queue being handled by the first I/O queue handling thread, and, responsive to determining that the preemption flag is equal to the first value, transferring the first set of one or more queue identifiers to a second I/O queue handling thread executing on a second processor. Transferring the first set of queue identifiers may include removing the one or more queue identifiers from the first set.

17 Claims, 8 Drawing Sheets

(56) References Cited

U.S. PATENT DOCUMENTS

| | | | | |
|---|---|---|---|---|
| 2015/0160967 A1* | 6/2015 | Mason | .................... | G06F 9/461 |
| | | | | 710/267 |
| 2017/0097826 A1* | 4/2017 | Shaikh | .................. | G06F 9/3858 |
| 2018/0349306 A1* | 12/2018 | Auernhammer | ...... | G06F 12/122 |
| 2021/0326177 A1* | 10/2021 | Vasudevan | ................ | G06F 9/52 |
| 2023/0401274 A1* | 12/2023 | Denninghoff | ....... | G06F 16/9577 |

OTHER PUBLICATIONS

Extended European Search Report Serial No. EP 22 168 378, dated Sep. 7, 2022, 8 pages.

* cited by examiner

EFFICIENT QUEUE ACCESS FOR USER-SPACE PACKET PROCESSING

TECHNICAL FIELD

The present disclosure is generally related to computer networking, and more particularly, to efficient queue access for user-space packet processing.

BACKGROUND

Digital communication networks enable computer systems to communicate with each other over interconnections that can use physical links or wireless links. A computer system can split data into data relatively small packets, each of which contains a portion of the data. The computer system can transmit each packet to a destination computer system that can be more efficiently and reliably transmitted through a communication network. Each packet can include information such as an origin address, destination address, length, and a payload, which is the portion of data included in the packet. The computer system can transmit each packet using a network interface controller (NIC), which can connect the computer system to a wired network, e.g., via a cable, or to a wireless network, e.g., via an antenna. Each packet can be sent to the destination computer system via a route through the network in accordance with a communication protocol. A protocol can include a set of rules that specify how information is sent via a network. For example, the Internet Protocol (IP) and Transmission Control Protocol (TCP) specify how packets are sent from an origin computer system to a destination computer system via the Internet.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
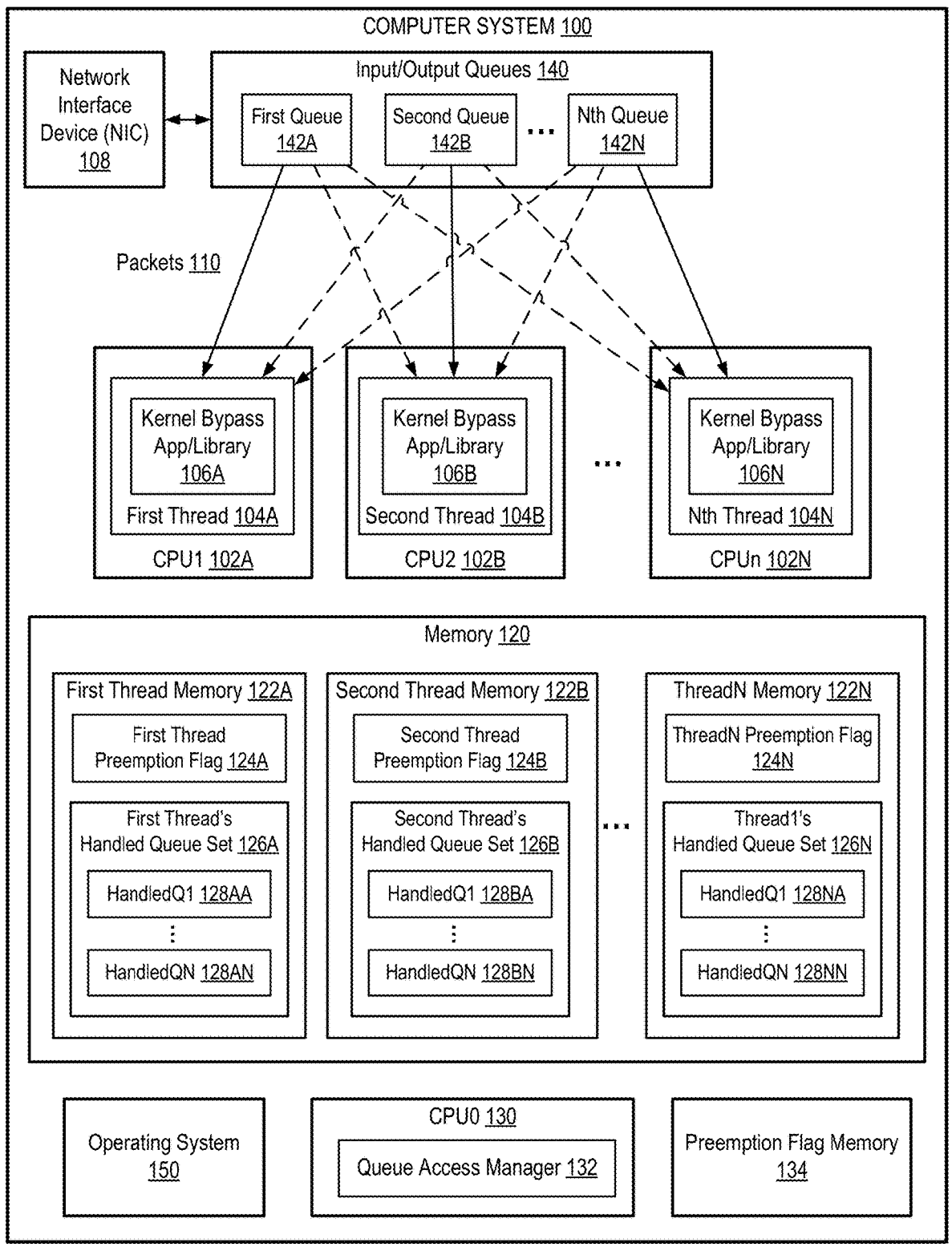
FIG. 1 depicts a high-level block diagram of an example computing system that enables a user space application to efficiently access multiple receive queues, in accordance with one or more aspects of the present disclosure.

Described herein are systems and methods for efficient queue access for user-space packet processing. A computer system can receive data from a network in the form of packets. The packets can be received by a network interface controller (NIC), which can cause each received packet to be stored in the receive queue. The NIC can trigger an interrupt that informs the operating system kernel of the arrival of the packet, and the operating system kernel can process the packet, e.g., by causing the packet to be delivered to a network protocol stack that performs further processing of the packet. Additional kernel interrupts may occur as the packet is processed by the network protocol stack, portions of which may be performed in user space instead of by the kernel. The data in the packet is eventually delivered to an application.

However, interrupting the operating system kernel, performing packet processing operations in the kernel, and switching between kernel space and user space can reduce system performance, e.g., because of the time involved in triggering and processing an interrupt, and the time used by the kernel to process the packet instead of performing other tasks. Alternative packet processing techniques that bypass the kernel can be used to improve packet processing performance. For example, kernel bypass techniques can pass incoming packets to user-space processes without interrupting the kernel. A kernel-bypass application runs in user space and is associated with a NIC. The kernel bypass application can poll one or more receive queues for incoming packets. If an incoming packet arrives, the polling operation detects the packet, and the packet can be processed in user space by the kernel bypass application and a user-space network stack. The user-space network stack can use multiple processor cores (e.g., CPUs) of the computer system to process packets, and the NIC can have multiple hardware receive queues.

The NIC can, for example, allocate each received packet to one of the hardware receive queues using Receive Side Scaling (RSS). Using RSS, the NIC can store each received packet in a hardware receive queue identified based on a hash of the packet's source and destination address information. The kernel bypass application can allocate a set of user-space receive queues, e.g., one user-space receive queue for each of the hardware receive queues. As an example, kernel bypass applications can be implemented using the Data Plane Development Kit (DPDK) library, which provides program code in the form of a library. Kernel bypass applications can interact with the library to dequeue and further process packets in user space.

As an example, each of the user space queues can correspond to one of the processor cores. Further, the kernel bypass application can allocate a set of processing threads that execute in user space and process packets from the user space receive queues. However, determining an appropriate number of processing threads is a difficult problem. Using too few processing threads can lead to suboptimal throughput, e.g., if the system is mostly idle. Using too many processing threads can also lead to inefficiencies. For example, a separate thread can be allocated for each user-space receive queue. In that case, when multiple applications compete for a core, if an operating system interrupt pauses execution of a thread that is in the process of forwarding a packet, the packet can remain unprocessed for a substantial amount of time, thereby blocking the queue or leading to packet reordering.

Another possible solution is to dedicate one or more processors to processing packets from receive queues. However, dedicating processors to performing packet processing introduces administrative complexity, and the appropriate number of processors may be difficult to determine, e.g., if one processor is not sufficient to handle the packet processing load. Further, dedicating processors to packet processing can lead to under-utilization or over-utilization of the processors, since the dedicated processors are not multiplexed among other tasks that could utilize available processor resources.

Aspects of the present disclosure address the above and other deficiencies by providing a queue management system that enables a first queue handling thread executing on a first processor to efficiently transfer processing of one or more input/output queues to a second queue handling thread executing on a second processor in response to determining that preemption of the first thread is forthcoming. Preemption of a thread can be imminent if, for example, the thread is to be preempted by the operating system within a threshold amount of time. Preemption of a thread can be performed by the operating system, and causes the preempted thread to wait for a period of time while another thread that performs another task, which may be unrelated to queue processing, executes on the processor that was executing the preempted thread. The preempted thread can resume executing at a subsequent time, but preemption can reduce performance of the thread and potentially cause packets to be dropped if the thread is preempted for a substantial amount of time. The thread can be preempted for a substantial amount of time if, for example, the processor is being used by numerous threads, or by threads that have higher priority than the preempted threat, for example.

The queue management system can include a queue access manager thread that can execute on a designated processor and identify a first thread for which preemption is imminent. The queue access manager thread can then set a preemption flag associated with the first thread. The first thread can check the preemption flag prior to performing certain operations, e.g., prior to polling queues or prior to de-queueing packets from queues. Upon determining that the preemption flag associated with the first thread has been set, the first thread can transfer the queues it is handling to a second thread having a preemption flag that is not set. The second thread can be on a different processor than the first thread, so queue handling can continue on the second processor while the first thread is preempted and waiting to resume execution. "Handling" a queue herein shall refer to de-queueing packets from the queue and performing operations on the de-queued packets, such as passing the de-queued packets to other system components for further processing. A queue handling thread can poll each queue for packets, e.g., by repeatedly checking each queue for packets. Upon determining that a packet is present in a queue, the queue handling thread can de-queue and process the packet.

Prior to being preempted, the first thread can transfer the queues it is handling by, for example, adding a list of the queues it is handling to a list of queues being handled by the second thread, or otherwise modifying a data structure in memory shared by both threads so that the second thread begins handling the queues in the list. The first thread can cleat its list of queues so that each queue is handled by one thread, and the second thread can continue processing the queues transferred from the first thread. In this way, the packet processing load can be balanced across multiple processors that can be shared with non packet processing tasks, so that processor utilization can remain high and packet processing can continue without waiting while other threads perform other tasks.

The manager thread can eventually determine that the first thread is ready to resume execution, or has resumed execution, and then clear the preemption flag associated with the first thread. Another thread on another processor, such as the second thread, can then transfer its handled threads to the first processor prior to preemption of the other thread, so that packet processing can continue without waiting for the second thread to resume execution.

The systems and methods described herein include technical improvements to virtualization technology. In particular, aspects of the present disclosure may improve the efficiency of processing input/output queues such as those associated with a network interface controller (NIC). When the operating system preempts a queue processing thread, the operating system causes the preempted thread to wait for a period of time while another thread that performs another task, which may be unrelated to queue processing, executes on the processor that was executing the preempted thread. Queue processing can continue in a second thread on another processor to which the first thread's handled queues were transferred. Thus, queue processing can continue at a high rate in the second thread while the first thread waits.

The second thread can similarly transfer its handled queues to another thread prior to being preempted, so queue processing can continue without waiting for preempted threads to resume execution. In this way, the packet processing load can be balanced across multiple processors that can be shared with non packet processing tasks, so that processor utilization can remain high. Since the manager thread identifies a non-preempted second processor prior to preemption of the first thread and transfers handling of the first thread's queues to the second processor, a packet in a queue handled by the first processor does not remain unprocessed for a substantial amount of time.

Various aspects of the above referenced methods and systems are described in details herein below by way of examples, rather than by way of limitation. The examples provided below discuss management of queue processing threads that can execute in user space as part of a kernel bypass application or libraries. In other examples, other processing threads can be managed by a computing system and may be absent the kernel bypass application or libraries.

FIG. 1 depicts a high-level block diagram of an example computing system that enables a user space application to efficiently access multiple receive queues, in accordance with one or more aspects of the present disclosure. A manager thread of a queue access manager 132 executing on a manager CPU 130 can identify a first input/output (I/O) queue handling thread 104A ("first thread") for which preemption is forthcoming, and set a preemption flag 124A associated with the first queue handling thread. The first thread 104A can check its associated preemption flag 124A prior to performing certain operations, e.g., prior to de-queueing packets from a first queue 142A. If the first queue handling thread 104A determines that the preemption flag 124A is set, then the first queue handling thread 104A can transfer the set of queue(s) 126A that it is handling to a second queue handling thread 104B instead of processing packets in the set of queue(s) 126A.

To transfer the set of queues 126A, the first queue handling thread 104A can identify a second queue handling thread 104B having an associated preemption flag 124B that is not set, which indicates that preemption of the second queue handling thread 104B is not forthcoming. Preemption is not forthcoming if, for example, it is not scheduled to occur within a threshold number of time units. The first queue handling thread 104A is executing on a first processor 102A, and the second queue handling thread 104B can be executing on a second processor 102B. Thus, execution of other tasks not related to queue handling can continue on the first processor 102A subsequent to preemption of the first queue handling thread 104A.

Prior to being preempted, the first queue handling thread 104A can pass the set of the queues 126A that it is handling to the second queue handling thread 104B. The second queue handling thread 104B can merge the received set with a list of queues 126B the second thread 104B is handling. The second queue handling thread 104B can then proceed to handle the threads 104 identified by the received set, e.g., by using the second processor 102B to poll each queue 142A identified by the merged set 126B and de-queue packets from queues 142 that have available packets 110.

The set of handled queues 126A can be passed between threads 104 in memory 120 that is shared by the threads 104, e.g., by copying the set 126A or by passing a reference to the location of the set 126A in memory 120. Subsequent to passing its set of queues 126A to the second queue handling thread 104B, the first queue handling thread 104A can clear its set of handled queues 126A so that the first queue handling thread 104A does not perform any further queue handling until its preemption flag 125A is cleared (e.g., becomes not set). The first queue handling thread's preemption flag 124A may be cleared when, for example, a manager thread of the queue access manager 132 determines that the first queue handling thread 104A is ready for execution, or is executing.

The second thread 104B can continue handling the transferred queues 142 until the manager thread determines that the second thread 104B is to be pre-empted, at which point the second thread 104B can transfer the set of handled queues 126B to another thread 104A, 104N, for example, that is not to be preempted within a threshold amount of time. The second thread 104B can transfer the set of handled queues 126B back to the first thread 104A, for example, if the preemption flag 124A associated with the first thread 104A is no longer set. As another example, the second thread 104B can transfer the handled queues 126B to a third thread 104N having an associated preemption flag that is not set. The queue handling threads 104 can be user-space threads that de-queue and process packets 110 from receive queues 142 in a kernel bypass application or library 106.

Computer system 100 may include hardware resources such as memory 120 and a network interface device 108, one or more Central Processing Units ("CPUs") 102, 130. Each CPU is also referred to herein as a "processor." Computer system 100 may also include an operating system 150, which can create and execute one or more user space processes. Each user space process can include one or more threads 104. Each thread 104 can execute on a CPU 102. Each thread 104 can access, e.g., read or write, data in memory 120. The computer system 100 may communicate with other computer systems via a network (not shown). The network interface device 108 sends data to the network and receives data from the network in the form of packets 110. The network may be a public network (e.g., the Internet), a private network (e.g., a local area network (LAN), wide area network (WAN)), or a combination thereof. In one example, the network may include a wired or a wireless infrastructure, which may be provided by one or more wireless communications systems, such as a wireless fidelity (WiFi) hotspot connected with the network and/or a wireless carrier system that can be implemented using various data processing equipment, communication towers, etc. It should be noted that other architectures for computer system 100 are possible, and that the implementations of the computing system utilizing embodiments of the disclosure are not necessarily limited to the specific architecture depicted.

Computer system 100 may be a single computing machine or multiple computing machines arranged in a homogenous or heterogeneous group (e.g., cluster, grid, server farm). Computer system 100 may include one or more rack mounted servers, workstations, desktop computers, notebook computers, tablet computers, mobile phones, palm-sized computing devices, personal digital assistants (PDAs), etc. In one example, computer system 100 may be a computing device implemented with x86 hardware. In another example, computer system 100 may be a computing device implemented with PowerPC®, SPARC®, other hardware, or a combination thereof.

Each CPU 102 may be a device capable of executing instructions encoding arithmetic, logical, or I/O operations. Each CPU 102 may be a single core processor, which may be capable of executing one instruction at a time (e.g., single pipeline of instructions) or a multi-core processor, which may simultaneously execute multiple instructions. Each CPU 102 may be a singe core processor embedded in a multi-core processor.

The computer system 100 may include an operating system 150, which may manage the execution of one or more computing processes and/or threads 104. A computing process may comprise one or more streams of execution for executing programmed instructions. The stream of instructions may include a sequence of instructions that can be executed by one or more CPUs 102. A computing process may be managed by a kernel or may be a part of kernel (not shown). In one example, a computing process may be an instance of a computer program that is being executed and may contain executable program code and a state of the current activity. Multiple computing processes may be executed concurrently by a CPU 102 that supports multiple processing units. For example, CPUs 102A, 102B, 102N may be processing units. The processing units may be provided by multiple processors or from a single processor with multiple cores or a combination thereof. A computing process may include one or more computing threads 104, such as a system thread, user thread, or fiber, or a combination thereof. A computing process may include a thread control block, one or more counters and a state (e.g., running, ready, waiting, start, done).

Each computing process may be associated with a particular level of privilege. The privilege levels of a computing process may be the same or similar to protection levels (e.g., processor protection rings) and may indicate an access level of a computing process to hardware resources (e.g., virtual or physical resources). There may be multiple different privilege levels assigned to the computing process. In one example, the privilege levels may correspond generally to either a kernel privilege level or a user space privilege level. The user space privilege level may enable a computing process or thread 104 to access resources assigned to the computing process but may restrict access to resources assigned to another user space or kernel space computing process. The kernel space privilege level may enable a computing process to access resources assigned to other kernel space or user space computing processes.

In another example, there may be a plurality of privilege levels, and the privilege levels may include a first level (e.g., ring 0) associated with a kernel, a second and third level (e.g., ring 1-2) associated with device drivers, and a fourth level (e.g., ring 3) that may be associated with user applications. An operating system may manage multiple computing processes, e.g., one or more user space processes. Each computing process may include threads 104 that execute a kernel bypass application or library 106, which can dequeue and process packets 110 as described below.

The operating system 150 and/or a kernel bypass application or library 106 may receive one or more data packets 152, e.g., via network interface device 108, from the network. Each data packet may include a destination address, a source address, a packet type (e.g. a protocol type, such as Ethernet, IP, TCP, UDP, or other defined protocol type), and a payload (e.g., the data contained in the packet).

Data packets may be received by the network interface device 108, and device driver program code and/or operating system program code that interacts with the network interface device 108 may enqueue the received data packets to input/output (I/O) queues 140. The network interface device 108 may include one or more internal queues (not shown) from which data packets are enqueued to the queues 140. In other embodiments, the queues 140 may be internal queues ("hardware queues") of the network interface device 108.

The data packets may be distributed across the queues 140. For example, one third of the packets received by the network interface device 108 may be enqueued to the First queue 142A, one-third to the second queue 142B, and one third to the Nth queue 142N. Distributing packets to queues 140 in this way can facilitate handling of the queues 140 (e.g., de-queueing packets from the queue and performing operations on the de-queued packets) by multiple CPUs 102 and/or multiple threads 104.

The kernel bypass application or library 106 may dequeue data packets 110 from queues 140 and process each data packet 110, e.g., by performing an operation based on data contained in the data packet. The operation can be, for example, providing the data packet to another component of the computer system 100, modifying the packet, forwarding the packet, or the like. The queues 140 include a first queue 142A, a second queue 142B, and a 142n. Each queue 142 can be, for example, a first-in, first-out data structure that can contain no packets (e.g., an empty queue), or can contain one or more packets. The queues 140 may be stored in memory 120 or other data storage component of the computer system 100.

The kernel bypass application or library 106 handles data packets 110 when executed by one or more threads 104. Each thread 104 may execute program code instructions, such as program code of the kernel bypass application or library 106, on one of the CPUs 102 for a period of time until the thread 104 is preempted by the operating system 150. A thread that has been preempted and has not yet resumed execution is in a "pre-empted state." During the time that the thread is in the pre-empted state, none of the instructions of the program code associated with the thread are executed by the CPU 102 on which the thread is otherwise executing. The operating system may cause other threads to be executed by the CPU 102 during the time that the pre-empted thread is waiting to execute. Thus, a pre-empted thread waits until the operating system causes the thread to continue executing on a CPU 102. The operating system may include a scheduler that determines which thread to execute at a particular time and when to pre-empt executing threads and allow another thread to execute. The other thread may continue to execute until it is pre-empted, at which point another thread, such as the previously pre-empted thread, can resume execution.

As shown in FIG. 1, a first thread 104A can execute a Kernel bypass application or library 106A on CPU1 102A to handle one or more queues 142. The first thread 104A may be pre-empted by the operating system 150 at particular times, and may resume execution subsequently until pre-empted again. Similarly, a second thread 104B can execute a Kernel bypass application or library 106B on CPU2 102B to handle one or more queues 142, and an Nth thread 104N can execute a Kernel bypass application or library 106N on CPUn 102N to handle one or more queues 142. Although three threads 104 are shown, the computer system 100 can include any suitable number of threads 104. Any number of threads 104 can be executed on the CPUs 102. Some of the threads 104 can be executing on the CPUs 104, and others of the threads 104 can be in a pre-empted state and not using a CPU. Each CPU 102 can correspond to a processor core that can execute a single thread at a time. Thus, for example, if there are three CPUs 102, then three threads can be executing in parallel.

Each thread 104 can handle (e.g., dequeue and process packets from) a single queue 142 at a time. For example, three queues 142 can be handled in parallel by three threads 104 executing on three CPUs 102 in parallel. Each thread can handle multiple queues 142 sequentially, e.g., by handling a first queue 142A, then subsequently handling a second queue 142B. The particular queue(s) 142 being handled by a thread 104 can change over time. For example, as shown by the solid arrows between the queues 142 and the threads 104, at an initial time, the first thread 104A can be handling the First queue 142A, the/140b can be handling the second queue 142B, and the Nth thread 104N can be handling the Nth queue 142N. However, in other examples, or at other times, the first thread 104A can be handling other queues instead of the First queue 142A, as shown by the dashed arrows from the second queue 142B and the Nth queue 142N to the first thread 104A. Similarly, the second thread 104B can be handling other queues instead of the second queue 142B, as shown by the dashed arrows from the first queue 142A and the Nth queue 142N to the second thread 104B. Further, the Nth thread 104N can be handling other queues instead of the Nth queue 142N, as shown by the dashed arrows from the first queue 142A and the second queue 142B to the Nth thread 104N.

The computer system 100 may also include a CPU0 130, which can act as a manager CPU, and can execute a queue access manager 132. The queue access manager 132 can include a manager thread, which can perform the operations of the queue access manager 132 described herein. The queue access manager 132 can, for example, execute as part of a kernel of operating system 150, and access kernel data structures such as scheduler data. The queue access manager 132 can identify particular threads 104 that are to be pre-empted (e.g., by the operating system) and set the preemption flag 124 associated with each I/O queue handling thread 104 that is scheduled to be pre-empted, as described below. The queue access manager 132 can, for example, perform a polling loop that queries the operating system scheduler for the state of each I/O queue handling thread 104. Although the queue access manager 132 is shown on CPU0 130, in other embodiments the queue access manager 132 can execute on any CPU of the computer system 100.

The queue access manager 132 can check for forthcoming preemption of each of the I/O queue handler threads 104. For example, to identify particular threads 104 that are to be pre-empted, the queue access manager 132 can check whether the current thread 104 on each of the CPUs 102 will be preempted within the next T time units. In some embodiments, the queue access manager 132 can perform the check periodically, e.g., at each timer tick of an operating system kernel or other clock. Timer ticks may occur, for example, in increments of 10 milliseconds. Alternatively, the queue access manager 132 can perform the periodic check at multiples of each operating system timer tick, e.g., every other timer tick (e.g., every 20 milliseconds), or every fourth timer tick, or other suitable multiple.

The queue access manager 132 can alternatively or additionally perform the check for forthcoming preemption of each of the I/O queue handler threads 104 in response to particular events, such as a notification from the operating system 150 that a change in the state of a thread 104 is forthcoming or has occurred. The state of a thread may be running, ready, or blocked, for example. A running thread is executing on a CPU 102. A ready thread is not executing on a CPU but is eligible to execute. A blocked thread is waiting for an operation, such as an I/O operation that cannot immediately be completed, or other operation that waits until a condition is satisfied. If a thread is to be preempted or, in another example, is to perform an operation that can cause the thread to enter the blocked state, or otherwise stop running, then the queue access manager 132 can identify the thread for preemption. Thus, the queue access manager 132 can identify a thread for pre-emption if the operating system provides an indication to the queue access manager 132 that the thread is to stop running within a threshold period of time. A thread may be expected to stop running within a threshold period of time if the operating system determines that the thread is to be pre-empted or otherwise stopped by the operating system within the threshold period of time. In another example, a thread may be expected to stop running if the thread is to perform an operation that can potentially cause the thread to block, such as an I/O operation or an operation that waits for a condition to be satisfied.

In some embodiments, the queue access manager 132 can perform the check for forthcoming preemption of each of the I/O queue handler threads 104 in response to a notification from a CPU 102 that a list of threads 104 to run by the operating system 150 on the CPU 102 has changed. The list of threads 104 to run may be, for example, a time-sorted tree of threads. Changes to the list of threads 104 may indicate that preemption of a thread 104 is forthcoming. Thus, a CPU 102 that makes a change to the list of threads 104 to run can send a notification to the queue access manager 132 (e.g., to the manager thread executing on CPU0 130), or, alternatively, the kernel bypass application or library 106 executing on the CPU 102 can periodically poll the operating system to determine whether the list of threads 104 to run has changed. If the kernel bypass application or library 106 determines that the list has changed, then the kernel bypass application or library 106 can send the notification to the queue access manager 132. The notification can instruct the manager thread of the queue access manager 132 to determine whether preemption of the first I/O queue handling thread is forthcoming. If the manager thread is not running, the notification can cause the operating system to run the manager thread (e.g., on CPU0). In response to receiving the notification, the manager thread of the queue access manager 132 can perform the check for forthcoming preemption of each of the I/O queue handler threads 104, or at least of each of the I/O handler threads executing on the CPU 102 that sent the notification.

The queue access manager 132 can also identify a particular thread 104 that is in a pre-empted state and is scheduled to resume execution on a CPU 102, so that one or more queues can be transferred to the particular thread 104 by other threads 104 for which preemption is forthcoming. In one example, the queue access manager 132 can clear the thread preemption flag 124A associated with each thread that is scheduled to be resumed (e.g., set the flag to false). The queue access manager 132 can identify the particular threads that are scheduled to be pre-empted or resumed based on information from a scheduler of the operating system 150, for example. The queue access manager 132 can run in kernel space and interact with the scheduler and access the information from the scheduler in kernel space. Alternatively or additionally, the queue access manager 132 can interact with the scheduler and access the information from the scheduler using a user-space programming interface of the scheduler.

Data structures used by the queue access manager 132 and the kernel bypass application or library 106 to transfer handling of queues 140 between threads 104 can be stored in the memory 120. The memory 120 includes first thread memory 122A, which stores information associated with the first thread 104A, second thread memory 122B, which stores information associated with the second thread 104B, and Nth thread memory 122N, which stores information associated with the Nth thread 104N. Although each portion 122 of the memory 120 is described as being associated with a particular thread, the memory 120 can be shared by the threads. Thus, each thread 104 can access any of the portions 122 of the memory. The threads can communicate with each other by storing and accessing information in the shared memory 120.

The first thread memory 122A includes a first thread preemption flag 124A, which indicates whether the first thread 104A is in a pre-empted state at a current time. Each thread preemption flag 124 can be mapped by the operating system 150 from preemption flag memory 134 that can be read from and written to by the queue access manager 132, into a memory page of memory 120 that is accessible to the kernel bypass application or library 106. The preemption flag memory region 134 may be in kernel space and accessible by the queue access manager 132, which may run in kernel space. Each thread preemption flag in preemption flag memory region 134 can be mapped to a read-only page of the memory 120 accessible by the threads 104, so that the kernel bypass application or library 106 executing on each thread 104 has permission to read but not modify the value of each thread preemption flag 124. The preemption flag memory region 134 can be mapped to read-only pages of the memory 120 similarly to a virtual dynamic shared object (vDSO) section, for example.

In some embodiments, a flag that has not been set can have the value "false" (or other designated value, such as 0) and a flag that has been set can have the value "true" (or other designated value, such as 1). A "clear" operation can assign the value "false" to a flag, and a thread that is not set is also referred to herein as "cleared." The first thread memory 122A also incudes a first thread's handled queue set 126A, which can include on or more queue identifiers 128AA-128AN. Each queue identifier 128AA-128AN identifies a queue that is being handled by the first thread 104A.

Similarly, the second thread memory 122B includes a second thread preemption flag 124B, which indicates whether the second thread 104B is in a pre-empted state at a current time. The second thread memory 122B also incudes a second thread's handled queue set 126B, which can include on or more queue identifiers 128BA-128BN. Each queue identifier 128BA-128BN identifies a queue that is being handled by the second thread 104B. Further, the second thread memory 122B includes a second thread preemption flag 124B, which indicates whether the second thread 104B is in a pre-empted state at a current time. The second thread memory 122B also incudes a second thread's handled queue set 126B, which can include on or more queue identifiers 128BA-128BN. Each queue identifier 128BA-128BN identifies a queue that is being handled by the second thread 104B. Although three thread memory regions 122 are shown, the memory 120 may include any suitable number of thread memory regions 122. For example, the memory 120 may include a thread memory region 122 for each thread 104.

Figure 2:
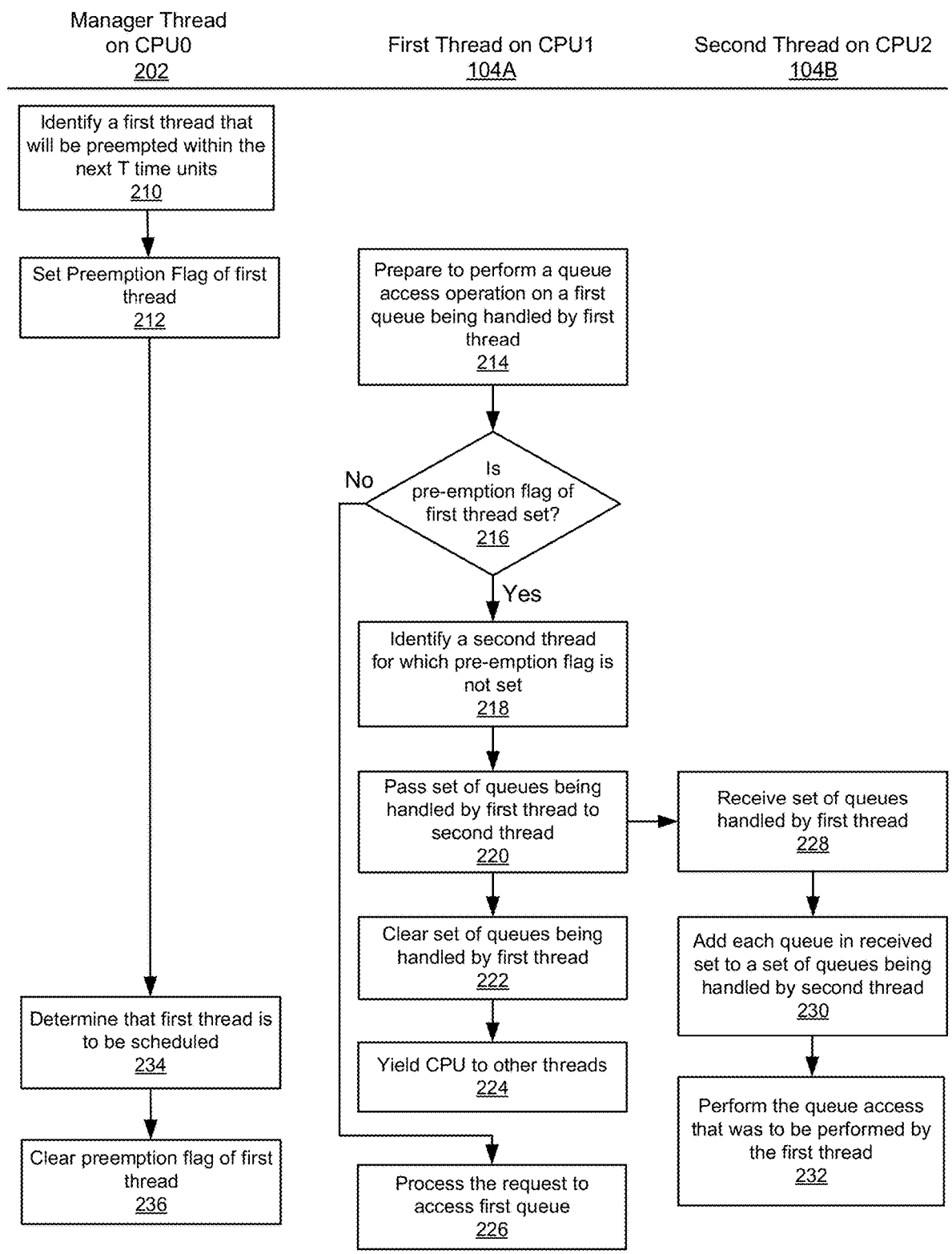
FIG. 2 depicts an interaction diagram showing an example transfer of queue handling from a first thread to a second thread prior to preemption of the first thread, in accordance with one or more aspects of the present disclosure.

FIG. 2 depicts an interaction diagram showing an example transfer of queue handling from a first thread to a second thread prior to preemption of the first thread, in accordance with one or more aspects of the present disclosure. The operations shown in FIG. 2 can be performed by, for example, program code instructions of a kernel bypass application or library 106 or other component executed by a manager thread 202, which can execute on CPU0 130, a first thread 104A, which can execute on a first CPU (e.g., CPU1 102A or other CPU), and a second thread 104B, which can execute on a second CPU (e.g., CPU2 102B or other CPU).

At operation 210, the manager thread 202 can identify a first thread that will be preempted within the next T time units. The value T can be predetermined, and can be pre-determined empirically, e.g., based on experiments or tests for which the predetermined value or a similar value produces desired results. As another example, the value of T can be specified by a system administrator or by the kernel bypass application or library 106. The value T can be, for example, 10 microseconds, 25 microseconds, or other value. The value T may also depend on the processing speed of each CPU 102. Operation 212 can set the preemption flag of the identified first thread. For example, if operation 210 determines that the first thread 104A on CPU2 102B is to be preempted in less than T time units, then operation 212 can set the first thread preemption flag 124A to "true."

At operation 214, the first thread 104A on CPU1 can prepare to access a first queue 142A that is being handled by the first thread 104A. At operation 216, the first thread 104A on CPU1 can determine whether the pre-emption flag 124A of the first thread 104A is set (e.g., has the value "true"). The kernel bypass application or library 106 can perform operation 216 prior to dequeuing a packet from a queue, for example. If operation 216 determines that the pre-emption flag of the first thread is set, then at operation 218 the first thread 104A can identify a second thread for which the associated pre-emption flag is not set. For example, if the second thread preemption flag 124B of the second thread 104B is not set, then at operation 218 the first thread 104A can identify the second thread 104B.

At operation 220, the first thread 104A can pass the set of queues 126A being handled by the first thread 104A to the second thread 104B. For example, the set of queues 126A can be a set of queue identifiers that identify one or more of the queues 140. At operating 228 the second thread 104B can receive the set of queues 126A being handled by the first thread 104A. At operation 230, the second thread 104B can add each queue in the received set to a set of queues 126B being handled by the second thread 104B. The set of queues 126A can be passed and added to the set of queues 126B by, for example, copying or appending the queue identifiers in the set of queues 126A to the set of queues 126B. Since both the first thread's set of queues 126A and the second thread's set of queues 126B are in the shared memory 120, the first thread's handled queue set 126A can be efficiently passed by updating data structures in memory, such as set data structures that represent the sets of queues 126A, 126B. At operation, the second thread 104B can perform the access operation that was prepared for at step 214. Although the kernel bypass application or library 106 initially prepared to perform the access operation on the first queue, the check of the first thread's preemption flag 124A determined that the first thread 104A on CPU1 102A is to be preempted, and the handling of the first queue 142A was transferred to the second thread 104B on CPU2 102B. Thus, the access operation that was initially to be performed by the first thread 104A on the First queue 142A is performed by the second thread 104B at operation 232.

Subsequent to performing operation 220, the first thread 104A can perform operations 222 and 224. At operation 222, the first thread 104A can clear the set of queues being handled by the first thread. At operation 224, the first thread 104A can yield the CPU on which it is executing (e.g., CPU1 in this example) to other threads. The first thread 104A can yield the CPU by executing a yield system call, for example.

If operation 216 determines that the pre-emption flag of the first thread is not set, then the first thread on CPU1 can perform the queue access operation at operation 226. Eventually, the operating system 150 determines that the first thread is to be scheduled for execution on a CPU. At operation 234, the manager thread on CPU0 detects this the operating systems determination that the first thread is to be scheduled. At operation 236, the manager thread on CPU0 clears the preemption flag of the first thread 104A. As a result of clearing the preemption flag of the first thread 104A, other threads, such as the second thread 104B, can transfer handling of queues to the first thread 104A.

Figure 3:
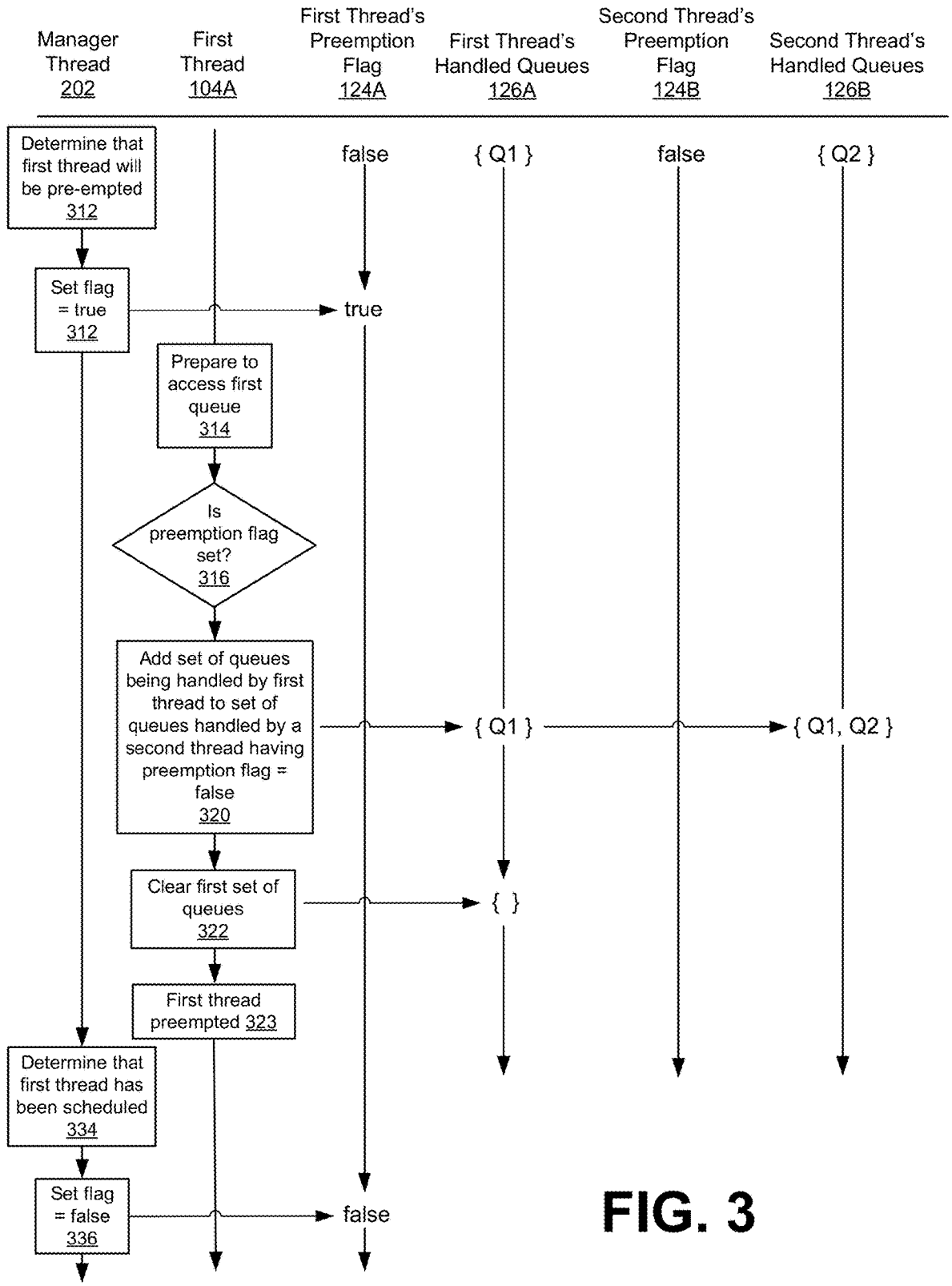
FIG. 3 depicts an interaction diagram showing example preemption flags and handled-queue lists involved in transfer of queue handling from a first thread to a second thread prior to preemption of the first thread, in accordance with one or more aspects of the present disclosure.

FIG. 3 depicts an interaction diagram showing example preemption flags and handled-queue lists involved in transfer of queue handling from a first thread to a second thread prior to preemption of the first thread, in accordance with one or more aspects of the present disclosure. The operations shown in FIG. 3 are similar to corresponding operations shown in FIG. 2. FIG. 3 shows how the first thread preemption flag 124A, first thread's handled queue set 126A, and second thread's handled queue set 126B can change over time in response to a set of handled queues being transferred from a first thread 104A to a second thread 104B. At an initial time, the first thread preemption flag 124A is false, the first thread's handled queue set 126A contains an identifier of the First queue 142A ("Q1"), the second thread preemption flag 124B is false, and the second thread's handled queue set 126B contains an identifier for the second queue 142B ("Q2").

At operation 312, the manager thread 202 can determine that the first thread is to be preempted, e.g., by querying a scheduler of an operating system 150. At operation 312, the manager thread 202 can set the first thread preemption flag 124A to true, as shown by the value "true" in the first thread preemption flag column 124A. At operation 314, the first thread 104A can prepare to access a first queue 142A that is being handled by a first thread 104A. At operation 316, the first thread 104A can determine whether the preemption flag of the first queue 142A is set. Operation 316 determines that the preemption flag of the first queue 142A is set, and at operation 320, the first thread 104A can add the set of queues being handled by the first thread to a set of queues being handled by a second thread having a preemption flag value of "false." The transfer of handling of Q1 from the first thread 104A to the second thread 104B is shown by the horizontal arrow from the "{Q1}" set in the first thread's handled queue set 126A column to the {Q1,Q2} set in the second thread's handled queue set 126B column. The queue identifier Q1 has been added to the second thread's handled queue set 126B, which initially was {Q2}. As a result of adding the Q1 identifier to the set 126B, the set 126B is changed to {Q1, Q2}.

At operation 322, the first thread 104A can clear the first set of queues 126A. The result of clearing the first set of queues 126A is an empty first set of queues 126A, as shown by the empty set "{ }" in the first thread preemption flag 124A column. Since the first set of queues 126A does not contain any queue identifiers, the first thread 104A does not dequeue or otherwise process packets. At operation 323, the first thread 104A is preempted by the operating system 150.

The operating system 150 can subsequently resume execution of the first thread 104A. At operation 334, the manager thread 202 can determine that the first thread has been scheduled for further execution. At operation 336, the manager thread 202 can set the first thread preemption flag 124A to false, since the first thread 104A is expected to resume execution for an amount of time sufficient to perform queue handling. The updated preemption flag 124A value of "false" is shown in the first thread preemption flag 124A column. The first thread 104A can subsequently resume dequeuing and processing packets upon determining, e.g., at operation 216, that the pre-emption flag 124A is false.

Figure 4:
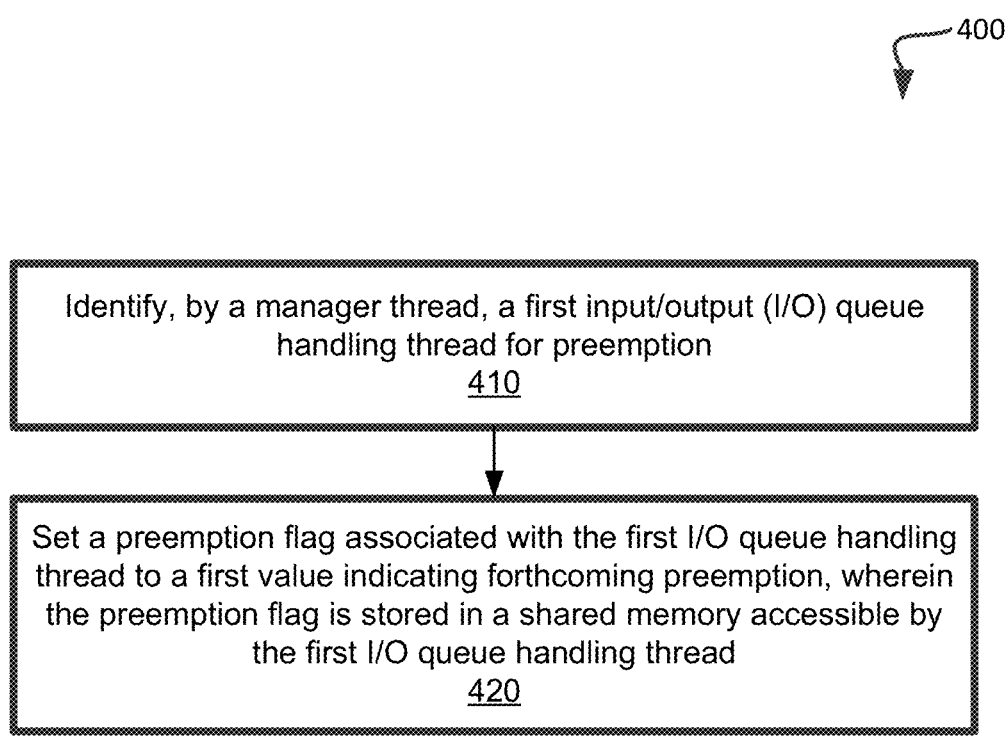
FIG. 4 depicts a flow diagram of an example method for managing thread preemption flags, in accordance with one or more aspects of the present disclosure.

FIG. 4 depicts a flow diagram of an example method 400 for managing thread preemption flags, in accordance with one or more aspects of the present disclosure. Method 400 and each of its individual functions, routines, subroutines, or operations may be performed by one or more processors of the computer device executing the method. In certain implementations, method 400 may be performed by a single processing thread. Alternatively, method 400 may be performed by two or more processing threads, each thread executing one or more individual functions, routines, subroutines, or operations of the method. In an illustrative example, the processing threads implementing method 400 may be synchronized (e.g., using semaphores, critical sections, and/or other thread synchronization mechanisms). Alternatively, the processes implementing method 400 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 400 may be performed by a queue access manager 132 as shown in FIG. 1 or by an executable code of a host machine (e.g., host operating system or firmware), a virtual machine (e.g., guest operating system or virtual firmware), an external device (e.g., a PCI device), other executable code, or a combination thereof.

Method 400 may be performed by processing devices of a server device or a client device and may begin at block 410. At block 410, a host computer system 100 may identify, by a manager thread, a first input/output (I/O) queue handling thread for preemption. The first I/O queue handling thread may be identified if, for example, preemption of the first I/O queue handling thread is to occur within a threshold period of time, e.g., according to scheduling information provided by an operating system scheduler. To identify the first I/O queue handling thread for preemption, the host computer system may determine that preemption of the first I/O queue handling thread is forthcoming. Preemption of the first queue I/O queue handling thread can be forthcoming if, for example, preemption of the first I/O queue handling thread is to occur within a threshold period of time according to scheduling information received from an operating system scheduler.

The manager thread may be executing on a designated processor, such as CPU0 130 of FIG. 1. The designated processor may be a different processor than processors on which I/O queue handling threads execute. Thus, for example, execution of the manager thread may be preempted less frequently than execution of the I/O queue handling threads, so that the manager thread can efficiently receive and process to scheduling information provided by the operating system scheduler. In one example, the manager thread may execute at a higher priority than other threads, thereby further reducing the frequency of preemption of the manager thread.

At block 420, the host computer system may set a preemption flag associated with the first thread to a value indicating that preemption is forthcoming, wherein the preemption flag is stored in shared memory accessible by the first queue handling thread. The value may be "true" or other predetermined value. The preemption flag can be stored in memory shared by the manager thread and the first queue handling thread. Responsive to completing the operations described herein above with reference to block 420, the method may terminate.

Figure 5:
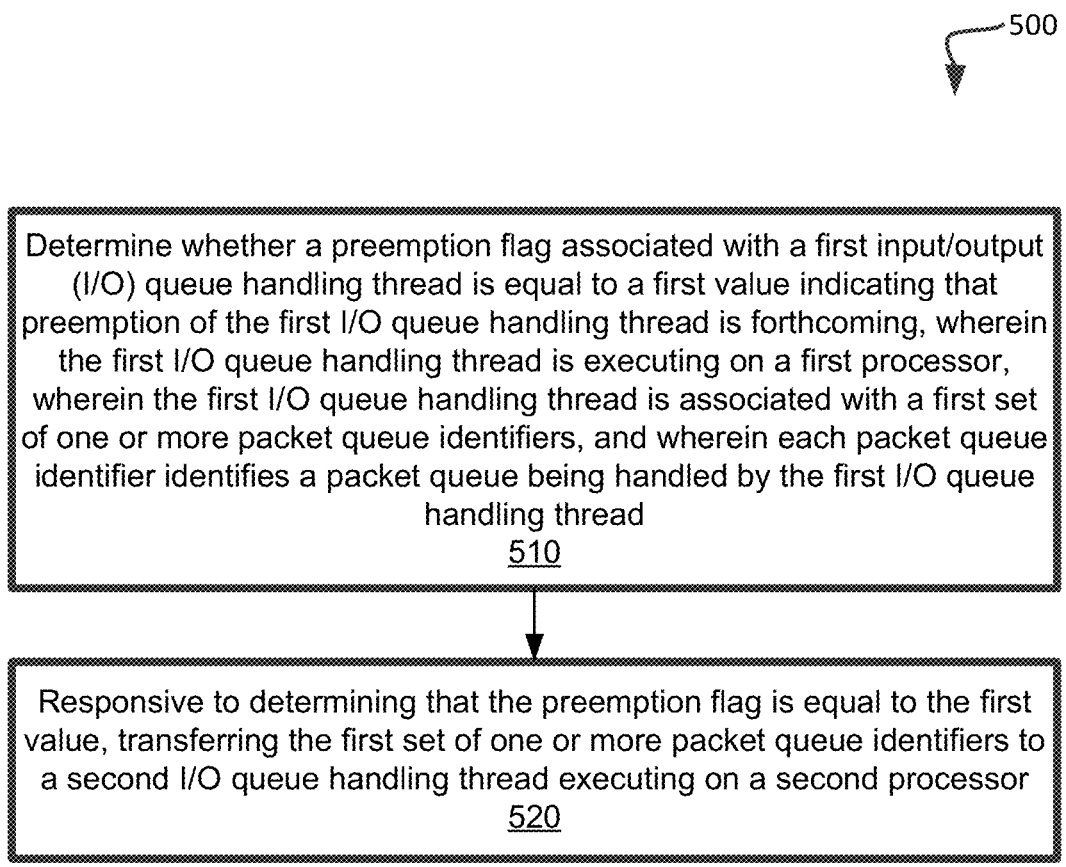
FIG. 5 depicts a flow diagram of an example method for transferring queue handling from a first thread to a second thread prior to preemption of the first thread, in accordance with one or more aspects of the present disclosure.

FIG. 5 depicts a flow diagram of an example method 500 for transferring queue handling from a first thread to a second thread prior to preemption of the first thread, in accordance with one or more aspects of the present disclosure. Method 500 and each of its individual functions, routines, subroutines, or operations may be performed by one or more processors of the computer device executing the method. In certain implementations, method 500 may be performed by a single processing thread. Alternatively, method 500 may be performed by two or more processing threads, each thread executing one or more individual functions, routines, subroutines, or operations of the method. In an illustrative example, the processing threads implementing method 500 may be synchronized (e.g., using semaphores, critical sections, and/or other thread synchronization mechanisms). Alternatively, the processes implementing method 500 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 500 may be performed by a queue access manager 132 as shown in FIG. 1 or by an executable code of a host machine (e.g., host operating system or firmware), a virtual machine (e.g., guest operating system or virtual firmware), an external device (e.g., a PCI device), other executable code, or a combination thereof.

Method 500 may be performed by processing devices of a server device or a client device and may begin at block 510. At block 510, a host computer system 100 may determine whether a preemption flag associated with a first input/output (I/O) handling thread is equal to a first value indicating that preemption of the first I/O queue handling thread is forthcoming, wherein the first I/O queue handling thread is executing on a first processor, wherein the first I/O queue handling thread is associated with a first set of one or more queue identifiers, and wherein each queue identifier identifies a queue being handled by the first I/O queue handling thread. The host computer system 100 may perform block 510 prior to de-queueing a packet from a queue identified by a queue identifier in the first set of one or more queue identifiers.

The host computer system 100 may transfer the first set of one or more queue identifiers to the second I/O queue handling thread via shared memory of the computer system 100 accessible to the first I/O queue handling thread and to the second I/O queue handling second thread. To transfer the set of one or more queue identifiers to the second I/O queue handling thread, the host computer system 100 may add (e.g., by appending, prepending, or inserting) the one or more queue identifiers to a second set of queue identifiers that are associated with the second I/O queue handling thread.

Transferring the set of one or more queue identifiers to the second I/O queue handling thread may include removing the one or more queue identifiers from the first set of queue identifiers being handled by the first I/O queue handling thread. Alternatively, transferring the set of one or more queue identifiers to the second I/O queue handling thread may include setting a pointer or object reference that references the first set of queue identifiers to reference an empty set of queue identifiers or other value (e.g., a null value) that corresponds to an empty set of queue identifiers.

In another example, a data structure stored in the shared memory can associate one or more sets of queue identifiers with each I/O queue handling thread. To transfer a set of queue handling threads, the data structure can be updated by removing an association between the first I/O queue handling thread and the first set of one or more queue identifiers, and creating an association between the second I/O queue handling thread and the first set of one or more queue identifiers. For each I/O queue handling thread, the I/O queue handling thread may dequeue and further process packets in each I/O queue of each set of queue identifiers associated with the I/O queue handling thread.

In another example, a queue mapping data structure stored in shared memory may include one or more queue-thread association entries, each of which associates a queue identifier with an I/O queue handling thread. Transferring the first set of one or more queue identifiers to a second I/O queue handling thread may be performed by changing each queue-thread association entry that associates an I/O queue with the first I/O queue handling thread to associate the I/O queue with the second I/O queue handling thread. This change can be performed by updating the thread portion of the entry in the shared memory. For each I/O queue handling thread, the I/O queue handling thread may dequeue and further process packets in each I/O queue specified in each of the entries that specifies the I/O queue handling thread.

At block 520, the host computer system may, responsive to determining that the preemption flag is equal to the first value, transferring the first set of one or more queue identifiers to a second I/O queue handling thread executing on a second processor. Transferring the first set of one or more queue identifiers to a second I/O queue handling thread executing on a second processor may include removing the one or more queue identifiers from the first set of queue identifiers being handled by the first I/O queue handling thread. Responsive to completing the operations described herein above with reference to block 520, the method may terminate.

Figure 6:
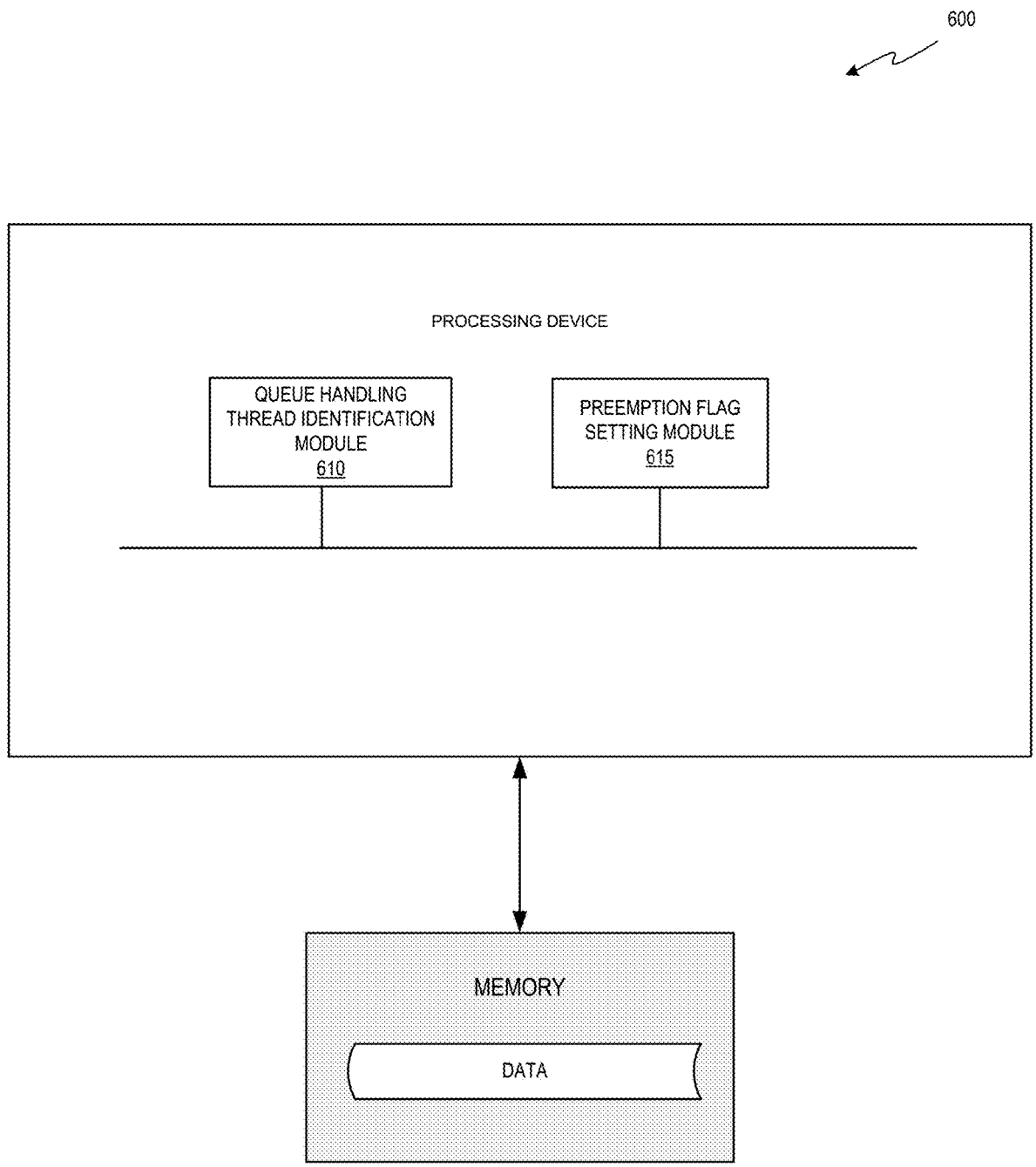
FIGS. 6 and 7 depict block diagrams of example computer systems in accordance with one or more aspects of the present disclosure.

FIG. 6 depicts a block diagram of a computer system 600 operating in accordance with one or more aspects of the present disclosure. Computer system 600 may be the same or similar to computing device 100 of FIG. 1, and may include one or more processors and one or more memory devices. In the example shown, computer system 600 may include a queue handling thread identification module 610 and a preemption flag setting module 615.

Queue handling thread identification module 610 may enable a processor to by a manager thread, a first input/output (I/O) queue handling thread for preemption. Queue handling thread identification module 610 may, as an example, enable the processor to determine that preemption of the first I/O queue handling thread is to occur within a threshold period of time. As another example, queue handling thread identification module 610 may enable the processor to determine that an operation that causes the first I/O queue handling thread to stop running is to occur within a threshold period of time. Preemption flag setting module 615 may enable the processor to set a preemption flag associated with the first I/O queue handling thread to a first value indicating forthcoming preemption, wherein the preemption flag is stored in a shared memory accessible by the first I/O queue handling thread.

Figure 7:
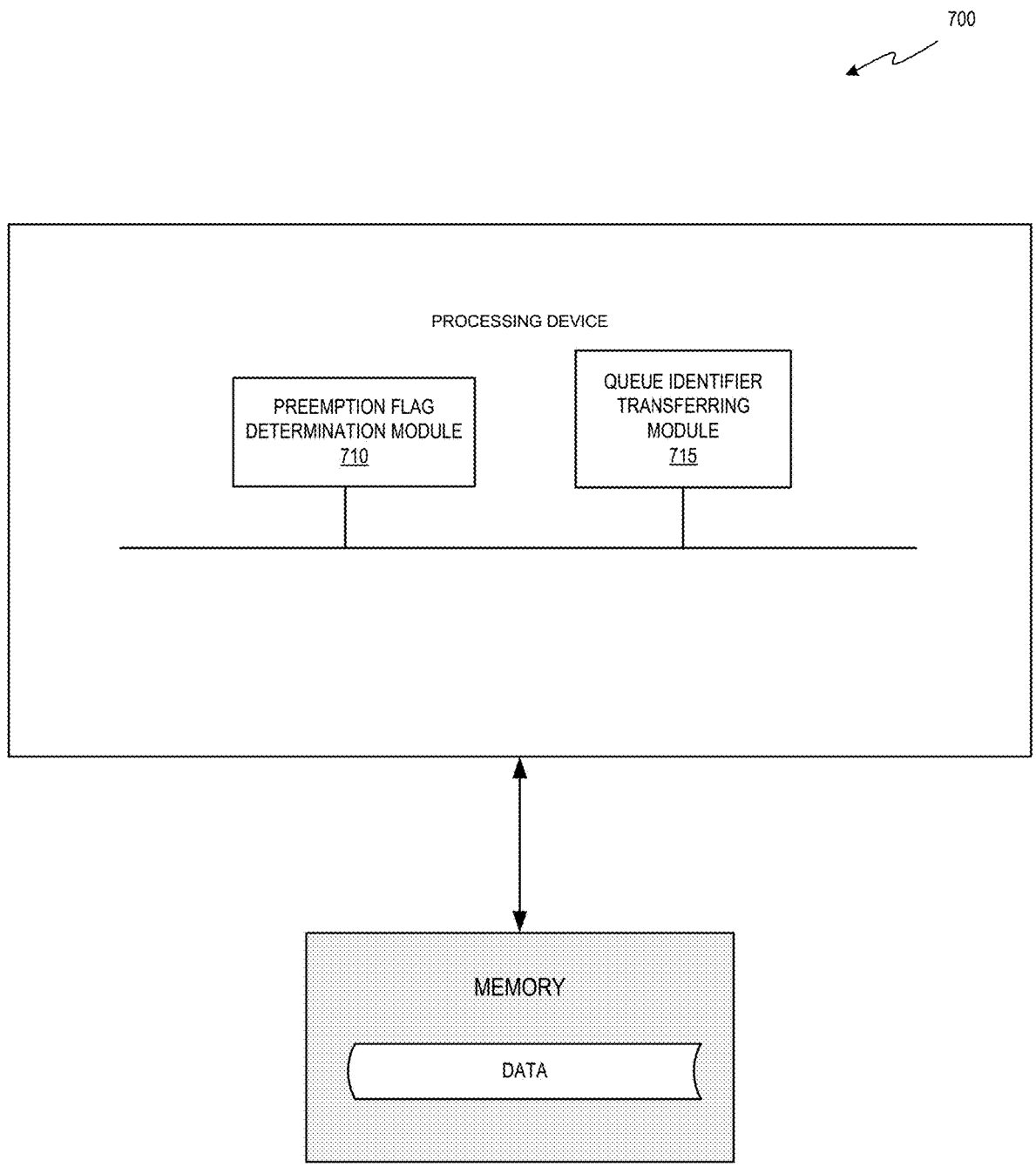

FIG. 7 depicts a block diagram of a computer system 700 operating in accordance with one or more aspects of the present disclosure. Computer system 700 may be the same or similar to computing device 100 of FIG. 1, and may include one or more processors and one or more memory devices. In the example shown, computer system 700 may include a preemption flag determination module 710 and a queue identifier transferring module 715.

Preemption flag determination module 710 may enable a processor to determine whether a preemption flag associated with a first input/output (I/O) queue handling thread is equal to a first value indicating that preemption of the first I/O queue handling thread is forthcoming, wherein the first I/O queue handling thread is executing on a first processor, wherein the first I/O queue handling thread is associated with a first set of one or more queue identifiers, and wherein each queue identifier identifies a queue being handled by the first I/O queue handling thread.

Queue identifier transferring module 715 may enable the processor to, responsive to determining that the preemption flag is equal to the first value, transfer the first set of one or more queue identifiers to a second I/O queue handling thread executing on a second processor. As an example, queue identifier transferring module 715 may enable the processor to add the one or more queue identifiers to a second set of queue identifiers that are associated with the second I/O queue handling thread.

Figure 8:
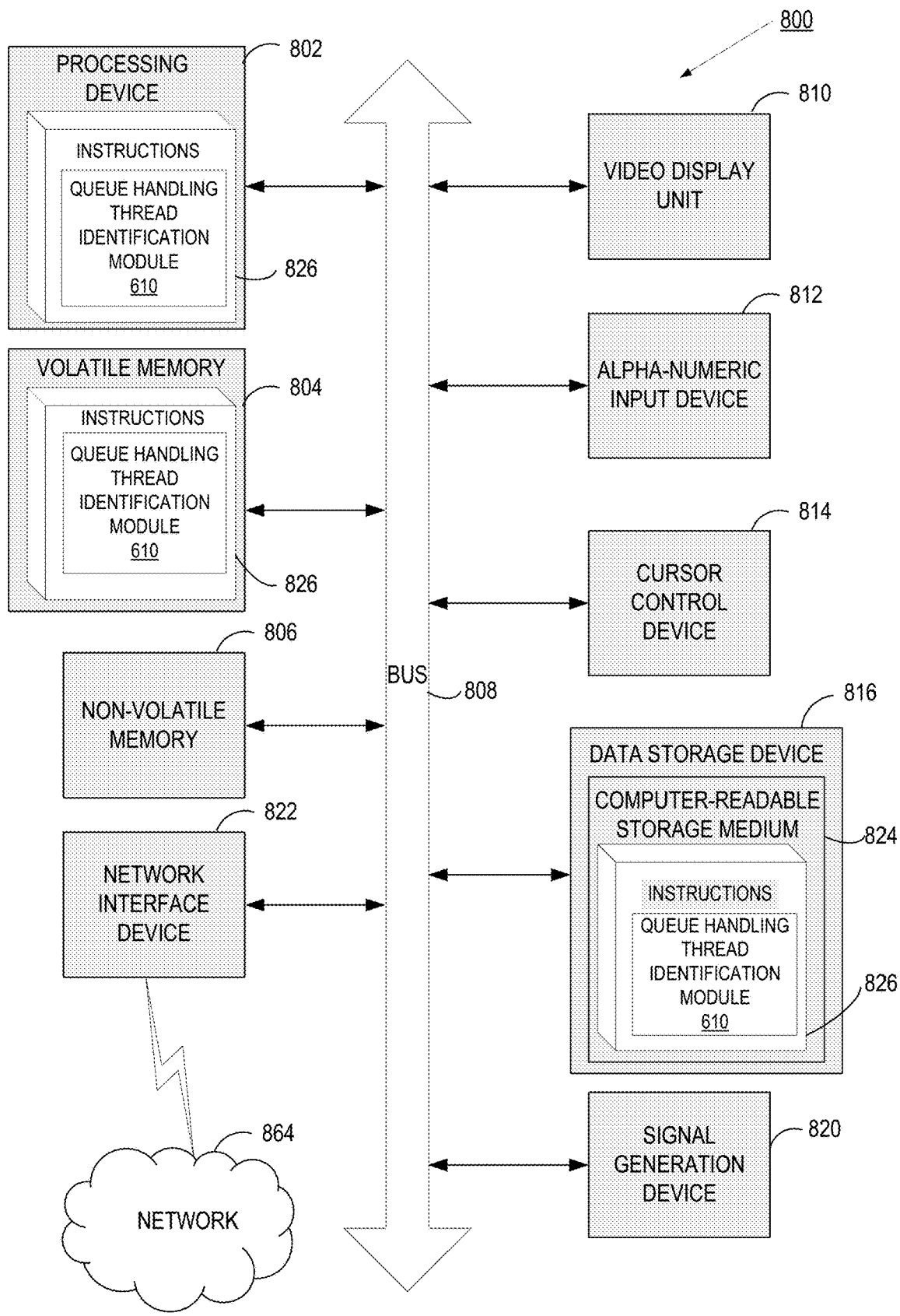
FIG. 8 depicts a block diagram of an illustrative computing device operating in accordance with the examples of the present disclosure.

FIG. 8 depicts a block diagram of a computer system operating in accordance with one or more aspects of the present disclosure. In various illustrative examples, computer system 800 may correspond to computer system 100 of FIG. 1. Computer system 800 may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical environment, but requests for a hard disk or memory may be managed by a virtualization layer of a computing device to translate these requests to the underlying physical computing hardware resources. This type of virtualization results in multiple VMs sharing physical resources.

In certain implementations, computer system 800 may be connected (e.g., via a network, such as a Local Area Network (LAN), an intranet, an extranet, or the Internet) to other computer systems. Computer system 800 may operate in the capacity of a server or a client computer in a client-server environment, or as a peer computer in a peer-to-peer or distributed network environment. Computer system 800 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 800 may include a processing device 802, a volatile memory 804 (e.g., random access memory (RAM)), a non-volatile memory 806 (e.g., read-only memory (ROM) or electrically-erasable programmable ROM (EEPROM)), and a data storage device 816, which may communicate with each other via a bus 808.

Processing device 802 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 800 may further include a network interface device 822. Computer system 800 also may include a video display unit 810 (e.g., an LCD), an alphanumeric input device 812 (e.g., a keyboard), a cursor control device 814 (e.g., a mouse), and a signal generation device 820.

Data storage device 816 may include a non-transitory computer-readable storage medium 824 on which may store instructions 826 encoding any one or more of the methods or functions described herein, including instructions for implementing method 400 or 500.

Instructions 826 may also reside, completely or partially, within volatile memory 804 and/or within processing device 802 during execution thereof by computer system 800, hence, volatile memory 804 and processing device 802 may also constitute machine-readable storage media.

While computer-readable storage medium 824 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

Other computer system designs and configurations may also be suitable to implement the system and methods described herein. The following examples illustrate various implementations in accordance with one or more aspects of the present disclosure.

Example 1 is a system comprising: a memory device comprising a group of memory units; and a processing device, operatively coupled to the memory device, to perform operations comprising: identifying, by a manager thread, a first input/output (I/O) queue handling thread for preemption; and setting a preemption flag associated with the first I/O queue handling thread to a first value indicating forthcoming preemption, wherein the preemption flag is stored in a shared memory accessible by the first I/O queue handling thread.

Example 2 is the system of Example 1, wherein identifying, by the manager thread, the first I/O queue handling thread for preemption comprises determining that preemption of the first I/O queue handling thread is to occur within a threshold period of time.

Example 3 is the system of Example 1, wherein identifying, by the manager thread, the first I/O queue handling thread for preemption comprises determining that an operation that causes the first I/O queue handling thread to stop running is to occur within a threshold period of time.

Example 4 is the system of Example 1, wherein identifying, by the manager thread, the first I/O queue handling thread for preemption is performed based on scheduling information received from an operating system thread scheduler.

Example 5 is the system of Example 1, wherein identifying, by the manager thread, the first I/O queue handling thread for preemption is performed periodically.

Example 6 is the system of Example 5, wherein identifying, by the manager thread, the first I/O queue handling thread for preemption is performed at times that are determined based on a timer tick.

Example 7 is the system of Example 1, wherein identifying, by the manager thread, the first I/O queue handling thread for preemption is performed in response to receiving, from another processor, a notification that instructs the manager thread to determine whether preemption of the first I/O queue handling thread is forthcoming.

Example 8 is the system of Example 1, the operations further comprising: determining, by the manager thread, subsequent to preemption of the first I/O queue handling thread, that the first I/O queue handling thread is scheduled to execute or is executing; and setting the preemption flag associated with the first I/O queue handling thread to a second value indicating no forthcoming preemption.

Example 9 is the system of Example 1, the operations further comprising: mapping a memory region that includes the preemption flag associated with the first I/O queue handling thread to a page of the shared memory accessible by the first I/O queue handling thread.

Example 10 is the system of Example 9, wherein the mapping of the memory region to the page of the shared memory is from kernel space to user space, and the page of the shared memory is a read-only page that is readable in user space by the first I/O queue handling thread.

Example 11 is a non-transitory machine-readable storage medium storing instructions which, when executed, cause a computer system to perform operations comprising: determining whether a preemption flag associated with a first input/output (I/O) queue handling thread is equal to a first value indicating that preemption of the first I/O queue handling thread is forthcoming, wherein the first I/O queue handling thread is executing on a first processor, wherein the first I/O queue handling thread is associated with a first set of one or more queue identifiers, and wherein each queue identifier identifies a queue being handled by the first I/O queue handling thread; and responsive to determining that the preemption flag is equal to the first value, transferring the first set of one or more queue identifiers to a second I/O queue handling thread executing on a second processor.

Example 12 is the non-transitory machine-readable storage medium of Example 11, wherein determining whether a preemption flag associated with a first I/O queue handling thread is equal to a first value is performed prior to de-queueing a packet from a queue identified by a queue identifier in the first set of one or more queue identifiers.

Example 13 is the non-transitory machine-readable storage medium of Example 11, wherein the first set of one or more queue identifiers is transferred to the second I/O queue handling thread via shared memory accessible to the first I/O queue handling thread and to the I/O queue handling the second I/O queue handling thread.

Example 14 is the non-transitory machine-readable storage medium of Example 11, wherein transferring the first set of one or more queue identifiers to the second I/O queue handling thread comprises adding the one or more queue identifiers to a second set of queue identifiers that are associated with the second I/O queue handling thread.

Example 15 is the non-transitory machine-readable storage medium of Example 11, wherein transferring the first set of one or more queue identifiers to the second I/O queue handling thread comprises removing the one or more queue identifiers from the first set of queue identifiers being handled by the first I/O queue handling thread.

Example 16 is the non-transitory machine-readable storage medium of Example 11, wherein transferring the first set of one or more queue identifiers to the second I/O queue handling thread comprises adding the one or more queue identifiers to a second set of queue identifiers that are associated with the second I/O queue handling thread.

Example 17 is the non-transitory machine-readable storage medium of Example 16, wherein the second set of queue identifiers is stored in a shared memory, and wherein transferring the first set of one or more queue identifiers to the second I/O queue handling thread comprises setting a thread identifier associated with each queue identifier in the first set of queue identifiers to a value that corresponds to the second I/O queue handling thread.

Example 18 is the non-transitory machine-readable storage medium of Example 11, wherein a queue mapping data structure stored in a shared memory includes one or more queue-thread association entries, each queue-thread association entries associates a particular queue identifier with particular I/O queue handling thread, and wherein transferring the first set of one or more queue identifiers to the second I/O queue handling thread comprises: identifying each queue-thread association entry that associates a specified queue identifier with the first I/O queue handling thread; and updating each identified queue-thread association to associate the specified queue identifier with the second I/O queue handling thread.

Example 19 is the non-transitory machine-readable storage medium of Example 11, the operations further comprising: responsive to determining that the preemption flag is equal to a second value indicating that preemption of the first I/O queue handling thread is not forthcoming, de-queueing one or more packets from at least one queue identified by at least one of the queue identifiers; and processing the one or more dequeued packets.

Example 20 is the non-transitory machine-readable storage medium of Example 11, the operations further comprising: determining that a list of threads to be run on the first processor by an operating system has changed; and responsive to determining that the list of threads has changed, sending a notification to a manager thread, wherein the notification instructs the manager thread to determine whether preemption of the first I/O queue handling thread is forthcoming.

Example 21 is a method comprising: determining, by a computer system, whether a preemption flag associated with a first input/output (I/O) queue handling thread is equal to a first value indicating that preemption of the first I/O queue handling thread is forthcoming, wherein the first I/O queue handling thread is executing on a first processor, wherein the first I/O queue handling thread is associated with a first set of one or more queue identifiers, and wherein each queue identifier identifies a queue being handled by the first I/O queue handling thread; and responsive to determining that the preemption flag is equal to the first value, transferring the first set of one or more queue identifiers to a second I/O queue handling thread executing on a second processor.

Example 22 is the method of Example 21, wherein determining whether a preemption flag associated with a first I/O queue handling thread is equal to a first value is performed prior to de-queueing a packet from a queue identified by a queue identifier in the first set of one or more queue identifiers.

Example 23 is an apparatus comprising: a means for determining whether a preemption flag associated with a first input/output (I/O) queue handling thread is equal to a first value indicating that preemption of the first I/O queue handling thread is forthcoming, wherein the first I/O queue handling thread is executing on a first processor, wherein the first I/O queue handling thread is associated with a first set of one or more queue identifiers, and wherein each queue identifier identifies a queue being handled by the first I/O queue handling thread; and a means for, responsive to determining that the preemption flag is equal to the first value, transferring the first set of one or more queue identifiers to a second I/O queue handling thread executing on a second processor.

Example 24 is the apparatus of Example 23, wherein determining whether a preemption flag associated with a first I/O queue handling thread is equal to a first value is performed prior to de-queueing a packet from a queue identified by a queue identifier in the first set of one or more queue identifiers.

Example 25 is the apparatus of Example 23, wherein the first set of one or more queue identifiers is transferred to the second I/O queue handling thread via shared memory accessible to the first I/O queue handling thread and to the I/O queue handling the second I/O queue handling thread.

Example 26 is the apparatus of Example 23, wherein the means for transferring the first set of one or more queue identifiers to the second I/O queue handling thread comprises means for adding the one or more queue identifiers to a second set of queue identifiers that are associated with the second I/O queue handling thread.

Example 27 is the apparatus of Example 23, wherein the means for transferring the first set of one or more queue identifiers to the second I/O queue handling thread comprises means for removing the one or more queue identifiers from the first set of queue identifiers being handled by the first I/O queue handling thread.

Example 28 is the apparatus of Example 23, wherein the means for transferring the first set of one or more queue identifiers to the second I/O queue handling thread comprises means for adding the one or more queue identifiers to a second set of queue identifiers that are associated with the second I/O queue handling thread.

Example 29 is the apparatus of Example 23, wherein the second set of queue identifiers is stored in a shared memory, and wherein the means for transferring the first set of one or more queue identifiers to the second I/O queue handling thread comprises means for setting a thread identifier associated with each queue identifier in the first set of queue identifiers to a value that corresponds to the second I/O queue handling thread.

Example 30 is the apparatus of Example 23, wherein a queue mapping data structure stored in a shared memory includes one or more queue-thread association entries, each queue-thread association entries associates a particular queue identifier with particular I/O queue handling thread, and wherein the means for transferring the first set of one or more queue identifiers to the second I/O queue handling thread comprises: means for identifying each queue-thread association entry that associates a specified queue identifier with the first I/O queue handling thread; and means for updating each identified queue-thread association to associate the specified queue identifier with the second I/O queue handling thread.

Example 31 is the apparatus of Example 23, the operations further comprising: means for, responsive to determining that the preemption flag is equal to a second value indicating that preemption of the first I/O queue handling thread is not forthcoming, de-queueing one or more packets from at least one queue identified by at least one of the queue identifiers; and means for processing the one or more dequeued packets.

Example 32 is the apparatus of Example 23, further comprising: means for determining that a list of threads to be run on the first processor by an operating system has changed; and means for, responsive to determining that the list of threads has changed, sending a notification to a manager thread, wherein the notification instructs the manager thread to determine whether preemption of the first I/O queue handling thread is forthcoming.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "determining," "deriving," "encrypting," "creating," "generating," "using," "accessing," "executing," "obtaining," "storing," "transmitting," "providing," "establishing," "receiving," "identifying," "initiating," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform method 400 or 500 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A system comprising:
   a memory device comprising a group of memory units; and
   a processing device, operatively coupled to the memory device, to perform operations comprising:
      determining whether a preemption flag associated with a first input/output (I/O) queue handling thread is equal to a first value indicating that preemption of the first I/O queue handling thread is forthcoming, wherein the first I/O queue handling thread is executing on a first processor, wherein the first I/O queue handling thread is associated with a first set of one or more queue identifiers, and wherein each queue identifier of the first set of one or more queue identifiers identifies a queue being handled by the first I/O queue handling thread; and
      responsive to determining that the preemption flag is equal to the first value, transferring the first set of one or more queue identifiers to a second I/O queue handling thread executing on a second processor, wherein the first set of one or more queue identifiers is transferred to the second I/O queue handling thread via shared memory accessible to the first I/O queue handling thread and to the second I/O queue handling thread.

2. The system of claim 1, wherein determining whether the preemption flag associated with the first I/O queue handling thread is equal to the first value is performed prior to de-queueing a packet from a queue identified by a queue identifier in the first set of one or more queue identifiers.

3. The system of claim 1, wherein transferring the first set of one or more queue identifiers to the second I/O queue handling thread comprises adding the one or more queue identifiers to a second set of queue identifiers that are associated with the second I/O queue handling thread.

4. The system of claim 1, wherein transferring the first set of one or more queue identifiers to the second I/O queue handling thread comprises removing the one or more queue identifiers from the first set of queue identifiers being handled by the first I/O queue handling thread.

5. The system of claim 1, wherein a queue mapping data structure stored in a shared memory includes one or more queue-thread association entries, each queue-thread association entries associates a particular queue identifier with particular I/O queue handling thread, and wherein transferring the first set of one or more queue identifiers to the second I/O queue handling thread comprises:
identifying each queue-thread association entry that associates a specified queue identifier with the first I/O queue handling thread; and
updating each identified queue-thread association to associate the specified queue identifier with the second I/O queue handling thread.

6. The system of claim 1, the operations further comprising:
responsive to determining that the preemption flag is equal to a second value indicating that preemption of the first I/O queue handling thread is not forthcoming, de-queueing one or more packets from at least one queue identified by at least one of the queue identifiers; and
processing the one or more dequeued packets.

7. The system of claim 1, the operations further comprising:
determining that a list of threads to be run on the first processor by an operating system has changed; and
responsive to determining that the list of threads has changed, sending a notification to a manager thread, wherein the notification instructs the manager thread to determine whether preemption of the first I/O queue handling thread is forthcoming.

8. A non-transitory machine-readable storage medium storing instructions which, when executed, cause a computer system to perform operations comprising:
determining whether a preemption flag associated with a first input/output (I/O) queue handling thread is equal to a first value indicating that preemption of the first I/O queue handling thread is forthcoming, wherein the first I/O queue handling thread is executing on a first processor, wherein the first I/O queue handling thread is associated with a first set of one or more queue identifiers, and wherein each queue identifier of the first set of one or more queue identifiers identifies a queue being handled by the first I/O queue handling thread; and
responsive to determining that the preemption flag is equal to the first value, transferring the first set of one or more queue identifiers to a second I/O queue handling thread executing on a second processor, wherein the first set of one or more queue identifiers is transferred to the second I/O queue handling thread via shared memory accessible to the first I/O queue handling thread and to the second I/O queue handling thread.

9. The non-transitory machine-readable storage medium of claim 8, wherein determining whether the preemption flag associated with the first I/O queue handling thread is equal to the first value is performed prior to de-queueing a packet from a queue identified by a queue identifier in the first set of one or more queue identifiers.

10. The non-transitory machine-readable storage medium of claim 8, wherein transferring the first set of one or more queue identifiers to the second I/O queue handling thread comprises adding the one or more queue identifiers to a second set of queue identifiers that are associated with the second I/O queue handling thread.

11. The non-transitory machine-readable storage medium of claim 8, wherein transferring the first set of one or more queue identifiers to the second I/O queue handling thread comprises removing the one or more queue identifiers from the first set of queue identifiers being handled by the first I/O queue handling thread.

12. The non-transitory machine-readable storage medium of claim 8, wherein a queue mapping data structure stored in a shared memory includes one or more queue-thread association entries, each queue-thread association entries associates a particular queue identifier with particular I/O queue handling thread, and wherein transferring the first set of one or more queue identifiers to the second I/O queue handling thread comprises:
identifying each queue-thread association entry that associates a specified queue identifier with the first I/O queue handling thread; and
updating each identified queue-thread association to associate the specified queue identifier with the second I/O queue handling thread.

13. The non-transitory machine-readable storage medium of claim 8, the operations further comprising:
responsive to determining that the preemption flag is equal to a second value indicating that preemption of the first I/O queue handling thread is not forthcoming, de-queueing one or more packets from at least one queue identified by at least one of the queue identifiers; and
processing the one or more dequeued packets.

14. The non-transitory machine-readable storage medium of claim 8, the operations further comprising:
determining that a list of threads to be run on the first processor by an operating system has changed; and
responsive to determining that the list of threads has changed, sending a notification to a manager thread, wherein the notification instructs the manager thread to determine whether preemption of the first I/O queue handling thread is forthcoming.

15. A method comprising:
determining whether a preemption flag associated with a first input/output (I/O) queue handling thread is equal to a first value indicating that preemption of the first I/O queue handling thread is forthcoming, wherein the first I/O queue handling thread is executing on a first processor, wherein the first I/O queue handling thread is associated with a first set of one or more queue identifiers, and wherein each queue identifier of the first set of one or more queue identifiers identifies a queue being handled by the first I/O queue handling thread; and responsive to determining that the preemption flag is equal to the first value, transferring the first set of one or more queue identifiers to a second I/O queue handling thread executing on a second processor, wherein the first set of one ore more queue identifiers is transferred to the second I/O queue handling thread via shared memory accessible to the first I/O queue handling thread and to the second I/O queue handling thread.

16. The method of claim 15, wherein determining whether the preemption flag associated with the first I/O queue handling thread is equal to the first value is performed prior to de-queueing a packet from a queue identified by a queue identifier in the first set of one or more queue identifiers.

17. The method of claim 15, wherein transferring the first set of one or more queue identifiers to the second I/O queue handling thread comprises adding the one or more queue identifiers to a second set of queue identifiers that are associated with the second I/O queue handling thread.

\* \* \* \* \*